(12) United States Patent
Shimizu

(10) Patent No.: US 6,739,031 B2
(45) Date of Patent: May 25, 2004

(54) METHOD AND MECHANISM FOR TRANSPORTING WORK

(75) Inventor: Toshiharu Shimizu, Mie (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 71 days.

(21) Appl. No.: 10/111,936

(22) PCT Filed: Sep. 13, 2001

(86) PCT No.: PCT/JP01/07939

§ 371 (c)(1),
(2), (4) Date: May 1, 2002

(87) PCT Pub. No.: WO02/22434

PCT Pub. Date: Mar. 21, 2002

(65) Prior Publication Data

US 2002/0152600 A1 Oct. 24, 2002

(30) Foreign Application Priority Data

Sep. 14, 2000 (JP) .................................... 2000-280364

(51) Int. Cl.[7] .............................................. B21D 39/03
(52) U.S. Cl. ............................. 29/430; 29/783; 29/784; 29/791; 29/822
(58) Field of Search .......................... 29/430, 783, 786, 29/791, 793, 794, 822, 823, 824, 784, 799

(56) References Cited

U.S. PATENT DOCUMENTS

| | | | | |
|---|---|---|---|---|
| 3,968,559 A | * | 7/1976 | Karlsson | 29/430 |
| 4,734,979 A | * | 4/1988 | Sakamoto et al. | 29/822 |
| 4,827,598 A | * | 5/1989 | Sakamoto et al. | 29/430 |
| 4,841,632 A | * | 6/1989 | Namiki et al. | 29/786 |
| 4,893,402 A | * | 1/1990 | Hirasaka et al. | 29/822 |
| 4,894,908 A | * | 1/1990 | Haba, Jr. et al. | 29/783 |
| 4,937,929 A | * | 7/1990 | Nokajima et al. | 29/430 |
| 5,143,270 A | * | 9/1992 | Hamada et al. | 29/793 |
| 5,664,323 A | * | 9/1997 | Ishida et al. | 29/822 |
| 5,873,165 A | * | 2/1999 | Bode et al. | 29/823 |
| 6,256,868 B1 | * | 7/2001 | Sugito et al. | 29/783 |
| 6,308,404 B1 | * | 10/2001 | Hirschmann et al. | 29/822 |

FOREIGN PATENT DOCUMENTS

| | | |
|---|---|---|
| JP | 63-130485 | 6/1988 |
| JP | 3-23116 | 3/1991 |
| JP | 5-104341 | 4/1993 |
| JP | 5-104359 | 4/1993 |
| JP | 6-297259 | 10/1994 |

\* cited by examiner

Primary Examiner—David P. Bryant
(74) Attorney, Agent, or Firm—Sughrue Mion, PLLC

(57) ABSTRACT

There is a module conveyance mechanism 1 projected, which comprises: lift means for transfer 6, in which the module constructed in a subline SL is made to move through a lower part than a floor side FL of a mainline ML; a slide mechanism 5, wherein the module is made to move through a lower part than the floor side of a mainline ML parallel to the floor thereof; the lift means for assembly 4, in which the module transferred from the slide mechanism 5 is made to rise to the assembly zone of the body F.

7 Claims, 7 Drawing Sheets

FIG.3
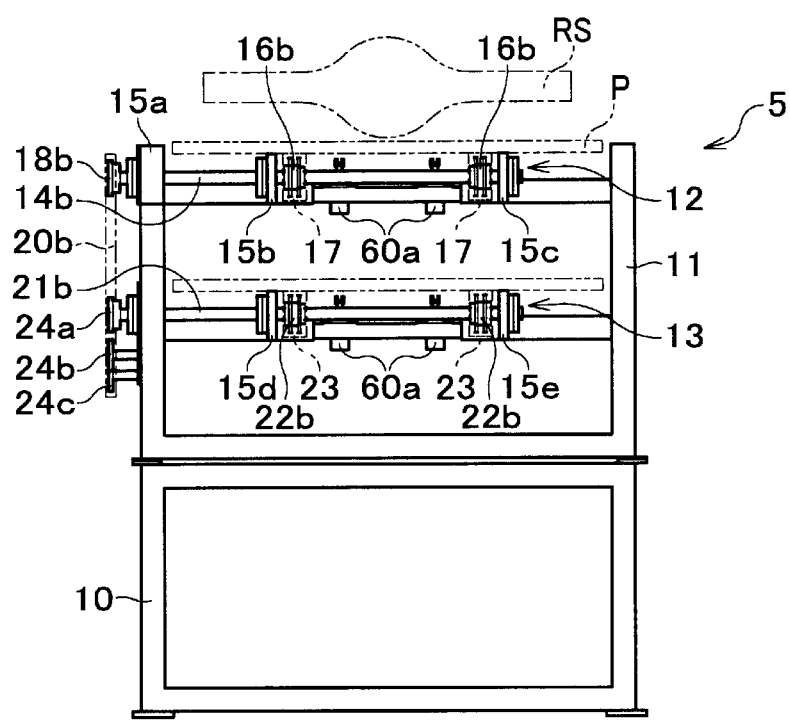
(a)
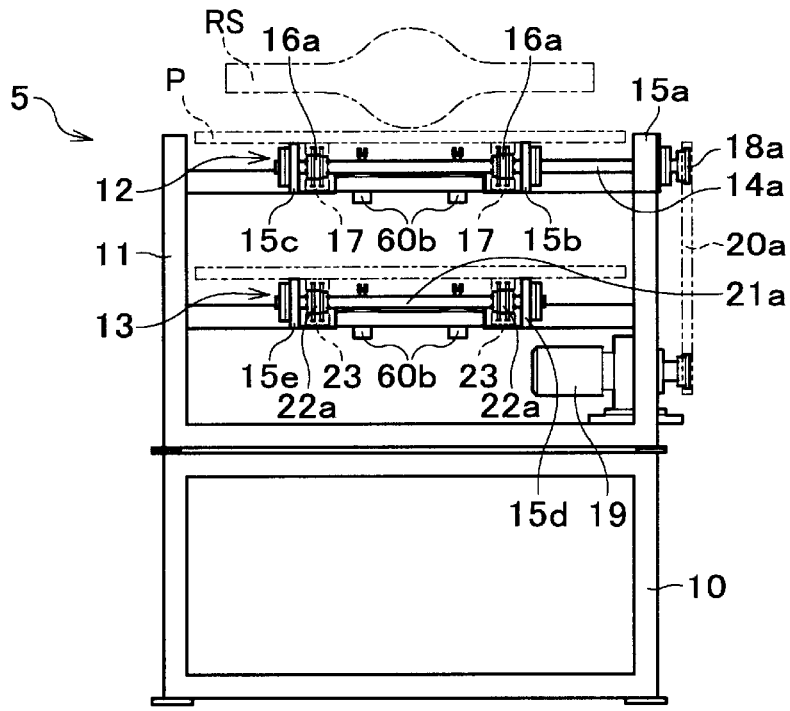
(b)

FIG.5
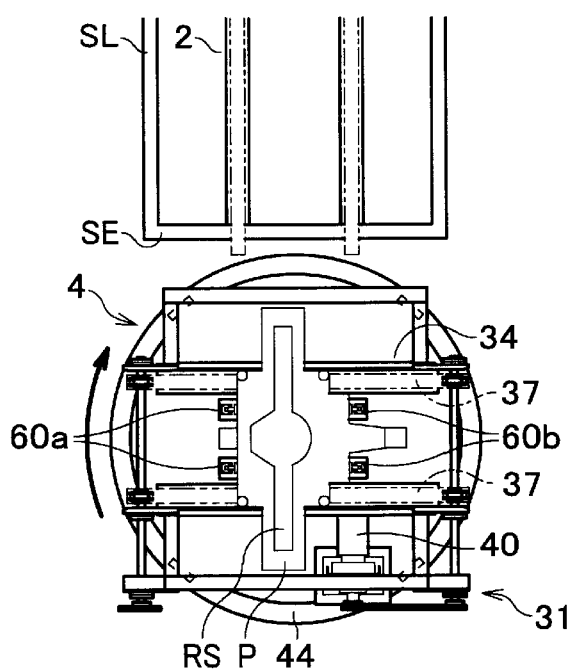
(a)
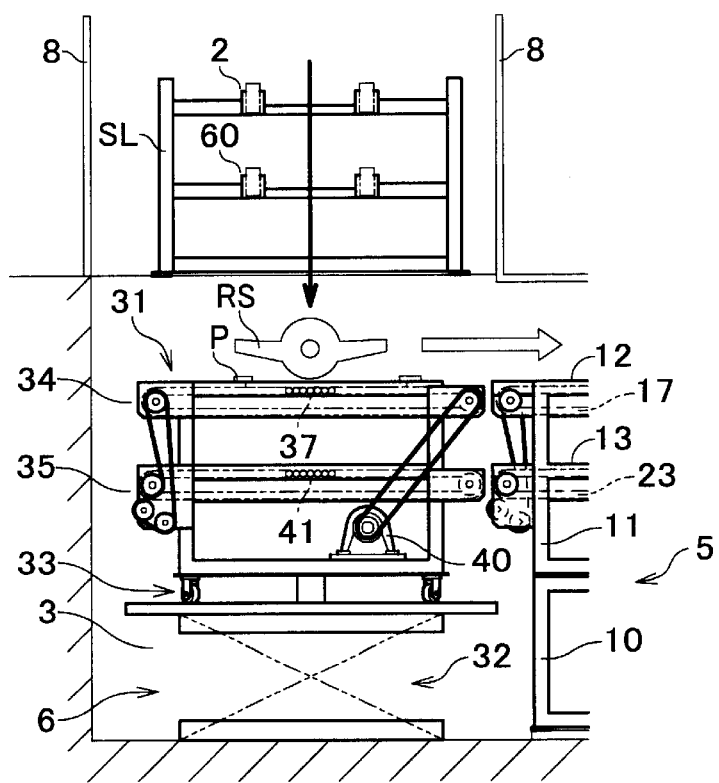
(b)

METHOD AND MECHANISM FOR TRANSPORTING WORK

FIELD OF THE INVENTION

The present invention relates to a work conveyance method for conveying a work constructed in a subline to an assembly zone for making a vehicle body in an assembly line thereof, and a work conveyance mechanism for the same.

BACKGROUND ART

As for the vehicle assembly line to assemble an automobile, it is constituted with a mainline, wherein various parts are assembled into the body of the automobile that is moved along a conveyance line with being hung from a hanger or being set on a pallet, a subline, wherein the work that contains a plurality of parts is constructed with, and the work conveyance mechanism, in which the work that is constructed in the subline is conveyed to the assembly zone for the automobile. Further, as the part that is assembled on the body, it is mentioned that a communication line such as a wiring for electric system or the like, interior parts such as installment panel or a seat, suspension system parts such as an engine or suspension and exterior parts such as a rear-vision mirror or a windshield wiper, and among these kind of parts above mentioned, the engine, the suspension or the like can be mentioned as a work put together into in the subline.

Hereupon, as a conventional embodiment for conveying the work constructed in the subline to the assembly zone for the body of the automobile, there can be Japanese patent Laid-open publication 1994-135538 mentioned.

As for the work conveyance mechanism indicated in Japanese patent Laid-open publication 1994-135538, it is the work conveyance mechanism, in which the body of the automobile moving along a ceiling side path with being hung from the hanger device is set up an internal combustion engine to, and which consists of a floor side path that is laid on and one part thereof seems to repeat with the ceiling side path; a self-propelled trolley that is transferred along the floor side path; and a device of ascend and descend for rising the internal combustion engine loaded onto the trolley to the assembly zone.

With the work conveyance mechanism constituted in such manner, in the area that the ceiling side path is superposed on the floor side path, there are moved the hanger device and the trolley in one body combined, because a transmission part of the hanger device that is to move is engaged with a power receiving part of the trolley, and more, there is the internal combustion engine supplied in the assembly zone, to which the device of ascend and descend on the trolley is let rise.

However, it is necessary in the work conveyance mechanism for the trolley to be provided with means, by which the trolley is let self-propel and the internal combustion engine is let rise thereto so that the trolley has become large-scale and complicated in structure as well.

When the trolley extends in covered area and becomes complicated, the work efficiency falls to that extent because a working space of a worker assembling works to the body becomes narrow, and also there is a possibility to constitute an obstacle in safety of the work.

Beside, in order to let the work efficiency of automobile assembly line improve, it is necessary to be constituted that the floor side path is to be formed widely and there are many large-sized trolleys lying moved in a cycle.

However, when the trolley becomes large-scale and the floor side path is extended, there are problems that the use efficiency of the floor space is let fall and the degree of freedom according to the automobile assembly line is ruined as well.

DISCLOSURE OF THE INVENTION

Accordingly, it is a problem to be settled of this invention that the works can be conveyed by a simple constitution immediately and the work conveyance method and the work conveyance mechanism are offered, in which they do not ruin the work environment of a worker performing an assembly work to the body.

As for the invention according to claim 1 of the present invention in order to solve the problem above mentioned, it is the work conveyance method to convey the work constructed in the subline to the assembly zone, which includes: a delivering process, in which the work is delivered from the subline; a moving process, in which the work is moved parallel to the mainline in a lower part than the floor side of the mainline and supplied to the supply position that is underneath the assembling zone; a lifting process, in which the work is let rise from the supply position to the assembling zone.

With the work conveyance method constituted in this way, it is possible that the work delivered from the subline is supplied to the assembly zone from the part that is via under part of the mainline lying on the floor. Accordingly, because a conveyance mechanism such as a rail or a turn mechanism is not laid on the floor side of the mainline, a working area of a worker can be secured fully and the efficiency of installation working of the work can be let improve.

Besides, as for the invention according to claim 2, there is a work conveyance mechanism suggested, wherein the work constructed in the subline is conveyed to the assembly zone of the body in order to assemble the work to the body moving on the mainline, which comprises a moving means, in which the work transferred from the subline is let move under the floor of the mainline and supplied to a supply position under the assembly zone; a lifting means for assembly, in which the work is risen from the supply position to the assembly zone.

With the work conveyance mechanism constituted in this way, the work transferred from the subline can be moved under the floor of the mainline through the moving means. And also the work can be let rise to the assembly zone of the body from the lower part through the lifting means mentioned above. Accordingly, because the conveyance mechanism such as rail or a turn mechanism is not laid by the floor side of the main line, a working area of a worker can be sufficiently secured and the efficiency of installation work of work can be let improve.

Further, as for the invention according to claim 3, there is suggested the work conveyance mechanism according to the claim 2 in which a moving means possesses a slide mechanism, in which the work is moved parallel to the floor side under the same; and a lift means for transfer, in which the work can be moved up and down in order to transfer to the slide mechanism from the subline.

With the work conveyance mechanism constituted in this way, the work transferred from the subline is once took down in the lower part of the floor with the means for transfer and after moved therein, the work can be supplied to the assembly zone. Accordingly, even if the mainline and the subline are laid in the same floor side, the work constructed in the subline can be supplied to the body by way of the lower part of the floor.

And, as for the invention to be concerned with the claim 4, there is suggested the work conveyance mechanism according to the claim 3 in which the lift means for transfer is provided with a turn means for letting a direction of the work turn a fixed angle.

According to the work conveyance mechanism that is constituted in this way, the work can be smoothly assembled to the body even if the work transferred is different in a direction from that to be assembled to the body.

Besides, as for the invention according to claim 5, there is suggested the work conveyance mechanism according to the claim 3 or the claim 4, wherein the slide mechanism possesses a first slide part in which a pallet loaded with the work is to be moved to the supply position and a second slide part which is arranged a fixed distance below from the first slide part, and the lift means for assembly can move from the supply position to a return position at which the pallet is returned in the second slide part.

According to the work conveyance mechanism that is constituted in this way, it is possible that the work is carried in the first slide part and after it is assembled to the body, an empty pallet is moved in the second slide part, so that the empty pallet can be quickly return to the subline. Accordingly, because the pallet that is going to convey the work can be circulated quickly or smoothly, it is possible that the constructing of the work and the assembling of the work to the body are performed by the good efficiency.

BRIEF DESCRIPTION OF THE DRAWINGS

FIG. 3 consists of (a) and (b), in which (a) is the side view which looked at the side view which looked at slide system from the side of the lift means for assembly and (b) is a slide system from a side of the lift means for transfer.

FIG. 5 consists of (a) and (b), in which (a) is an illustration to show a turn of a receipt part and (b) is an illustration to explain a descent of a receipt part and a movement of pallets from a receipt part to the slide mechanism.

BEST MODE FOR CARRYING OUT THE INVENTION

Referring now to a preferred embodiment, this invention will be described in further detail with reference to the accompanying drawings.

Figure 1:
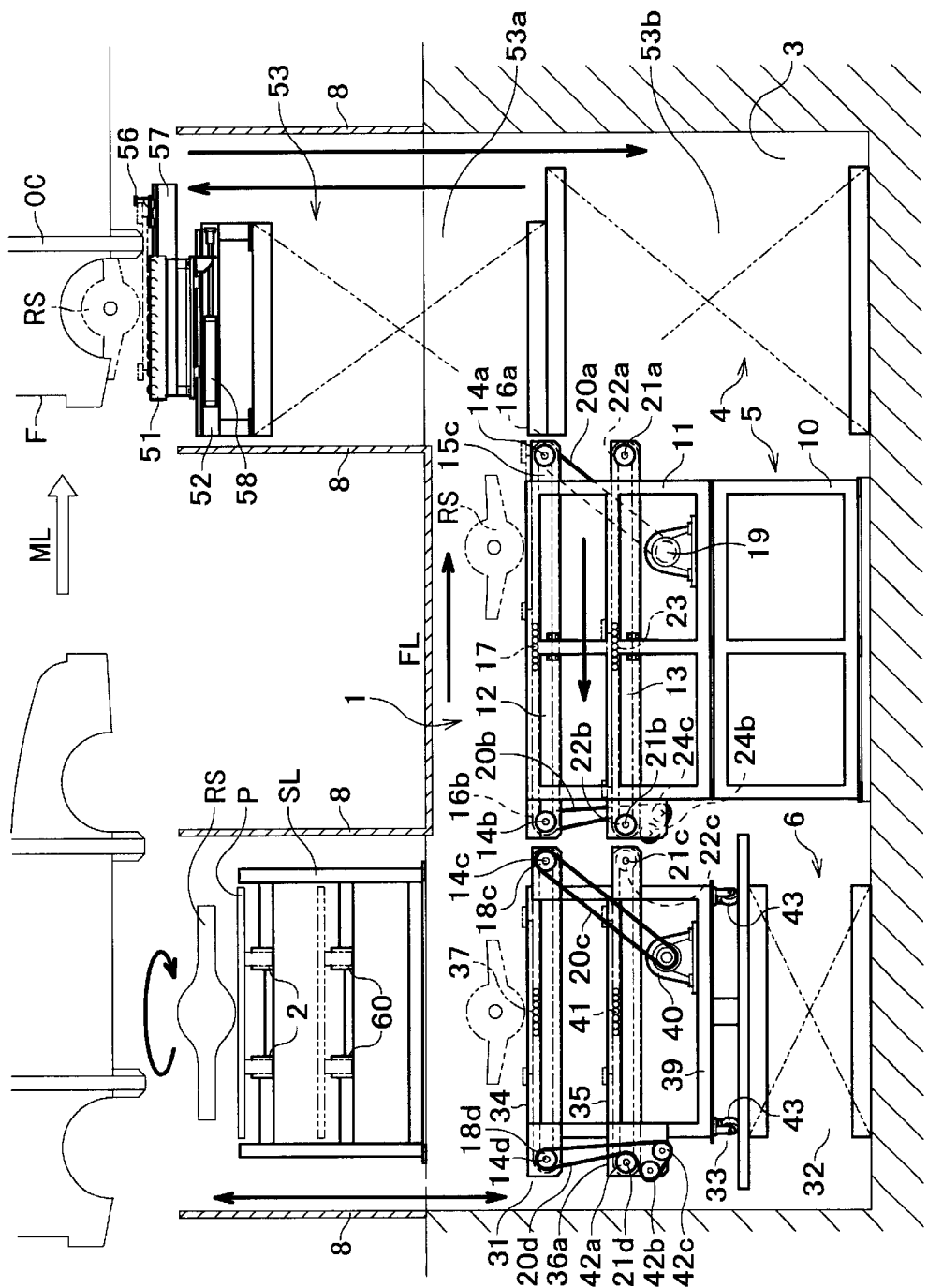
FIG. 1 is a front elevation showing the work conveyance mechanism of the embodiment of this invention.
Figure 2:
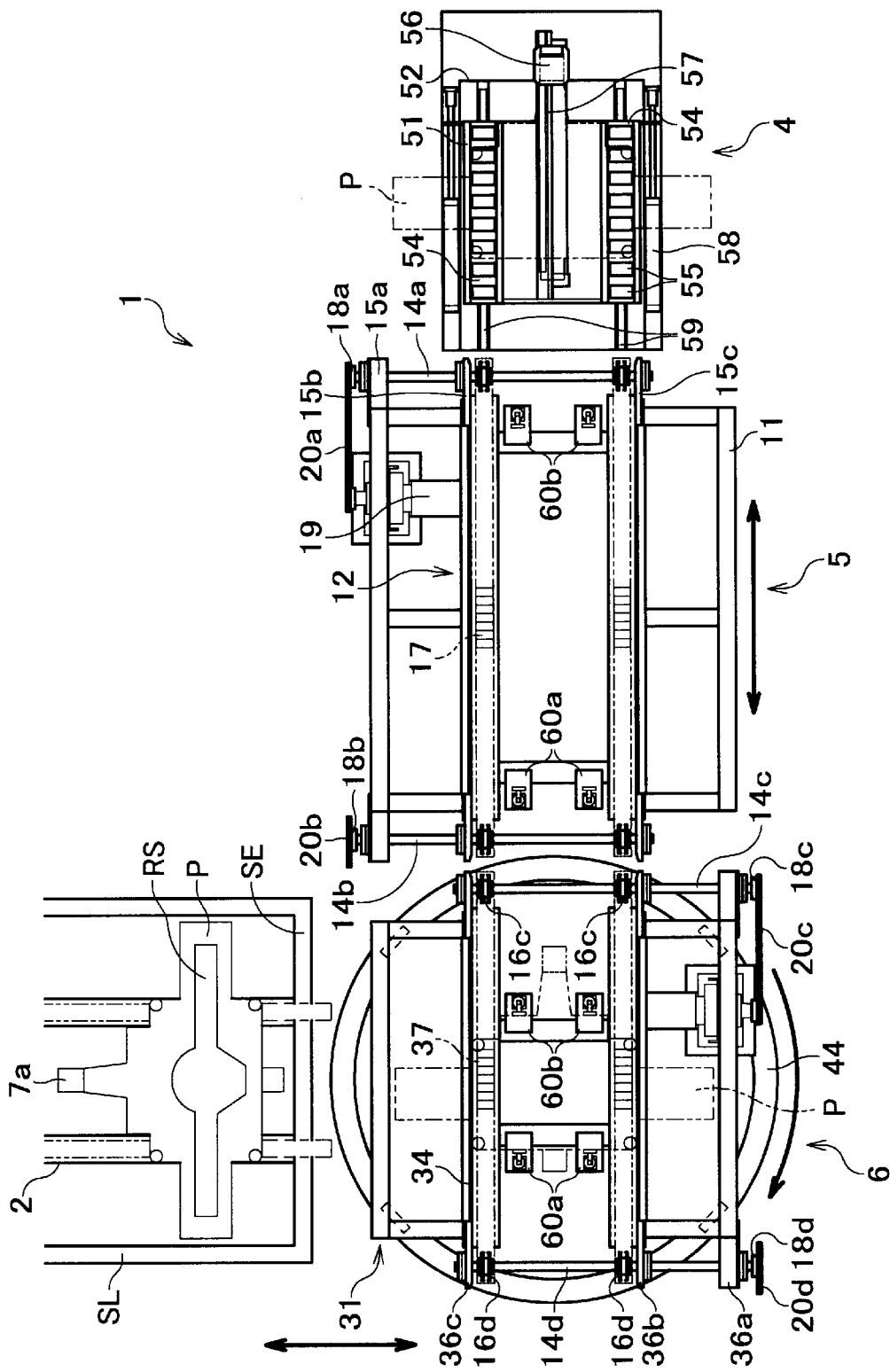
FIG. 2 is a ground plan to show the work conveyance mechanism of the embodiment of this invention.

FIG. 1 is a front elevation of the work conveyance mechanism in the embodiment, and FIG. 2 is the ground plan, which is looked at the work conveyance system from the top. Hereinafter, the work is explained as a rear suspension RS in the embodiment. Besides, a direction to which the body F moves with the mainline ML (a direction gone to right from left shown in FIG. 1) is determined as the front direction.

As for the mainline ML of the embodiment, as shown in FIGS. 1 and 2, there is suggested a line in which a suspension member such as a rear suspension RS or an engine is assembled to the body F that is hung from an overhead conveyor OC that is moved therewith, wherein the body is conveyed from the left to the right in FIGS. Further, there is the work conveyance mechanism 1 provided with, more underneath than the floor side FL having the mainline ML, in which the rear suspension RS constructed in the subline is assembled to the body F.

Hereupon, as for the subline SL, it is laid at a right angle to the mainline ML, and in which fixed members are assembled to the rear suspension RS during conveying of the pallet P by a chain conveyer 2 and constructing thereof is finished by the pallet P arriving at the terminal SE of the subline SL.

The work conveyance mechanism 1 comprises: the lift means for assembly 4, through which the rear suspension RS is let rise to the body F from a basement pit 3 that is arranged along the mainline ML; the slide mechanism 5, in which the rear suspension RS is let move parallel to the floor side FL to the lift means for assembly 4 for supply in the lower part than the floor side FL; the lift means for transfer 6, by which the slide mechanism 5 and the subline SL are connected. Further, the moving means according to the claims of this invention is constituted with both the slide mechanism 5 and the lift means for transfer 6.

Hereupon, in the work conveyance mechanism 1 and the subline SL, the rear suspension RS loaded with the pallet P is carried and this pallet P consists of a tabular member and has a protruding point part 7a.

Still more, a fence 8 is arranged to an opening part of the basement pit 3 and prevents workers from falling.

Subsequently, it is described that each constitution element of work conveyance mechanism 1.

First, as for the slide mechanism 5, there are a first slide part 12 and a second slide part 13 provided, which are made of a chain conveyer established with a main frame body 11 to form on a base 10 (shown in FIGS. 1, 2 and 3(*a*), (*b*)).

The first slide part 12 has a rotation axis 14*a* of the lift means for assembly 4 side and a rotation axis 14*b* of the lift means for transfer 6 side, and, as for the axis 14*a* and the rotation axis 14*b*, they are supported, respectively through bearing by side frames 15*a*, 15*b*, 15*c* of the main frame body 11. Furthermore, the rotation axis 14*a* is equipped with a sprocket 16*a*, 16*a* and the rotation axis 14*b* is equipped with a sprocket 16*b*, 16*b*, respectively and a chain 17 binds each opposing sprocket 16*a* and sprocket 16*b*.

Moreover, there is a pulley 18*a* formed in the side frame 15*a* side of the axis 14*a* to show it in FIG. 3(*b*) and which drives the chain 17 by communicating a turn of a motor for driving of slide mechanism 19 arranged at the lower part of the main frame body 11 to this pulley 18*a* through a belt 20*a*.

On the other hand, as shown in FIG. 3(*a*), there is the pulley 18*b* provided which is made for the side frame 15*a* side of the rotation axis 14*b* and communicates a turn of the rotation axis 14*b* with drive of chain 17 to the second slide part 13 through the belt 20*b*.

Similarly, the second slide part 13, as shown in FIGS. 3(a) and (b), comprises: the rotation axis 21a or the rotation axis 21b supported with the side frame 15a, 15d and 15e: two sprockets 22a arranged around the rotation axis 21a; two sprockets 22b arranged around the rotation axis 21b; and the chain 23. The chain 23 being hung and wound tightly around each interval formed each sprocket 22a and each sprocket 22b, which stand opposite to each other.

Besides, a pulley 24a is made for the side frame 15a side of the rotation axis 21b (as shown in FIG. 3(a)) and communicates a turn of the rotation axis 14b of the first slide part 12 to the pulley 24a by putting the belt 20b with the pulley 24a and the pulley 24b arranged underneath. Moreover, the pulley 24c being a thing to keep a tension of the belt 20b, and the pulley 24b and the pulley 24c are both supported by the side frame 15a.

Accordingly, a turn of the rotation axis 14b is communicated to the pulley 24a through the belt 20b when the chain 17 of the first slide part 13 is driven, so that the rotation axis 21b turns, and the chain 23 of the second slide part 14 is driven.

Subsequently, the lift means for transfer 6 is described.

Figure 4:
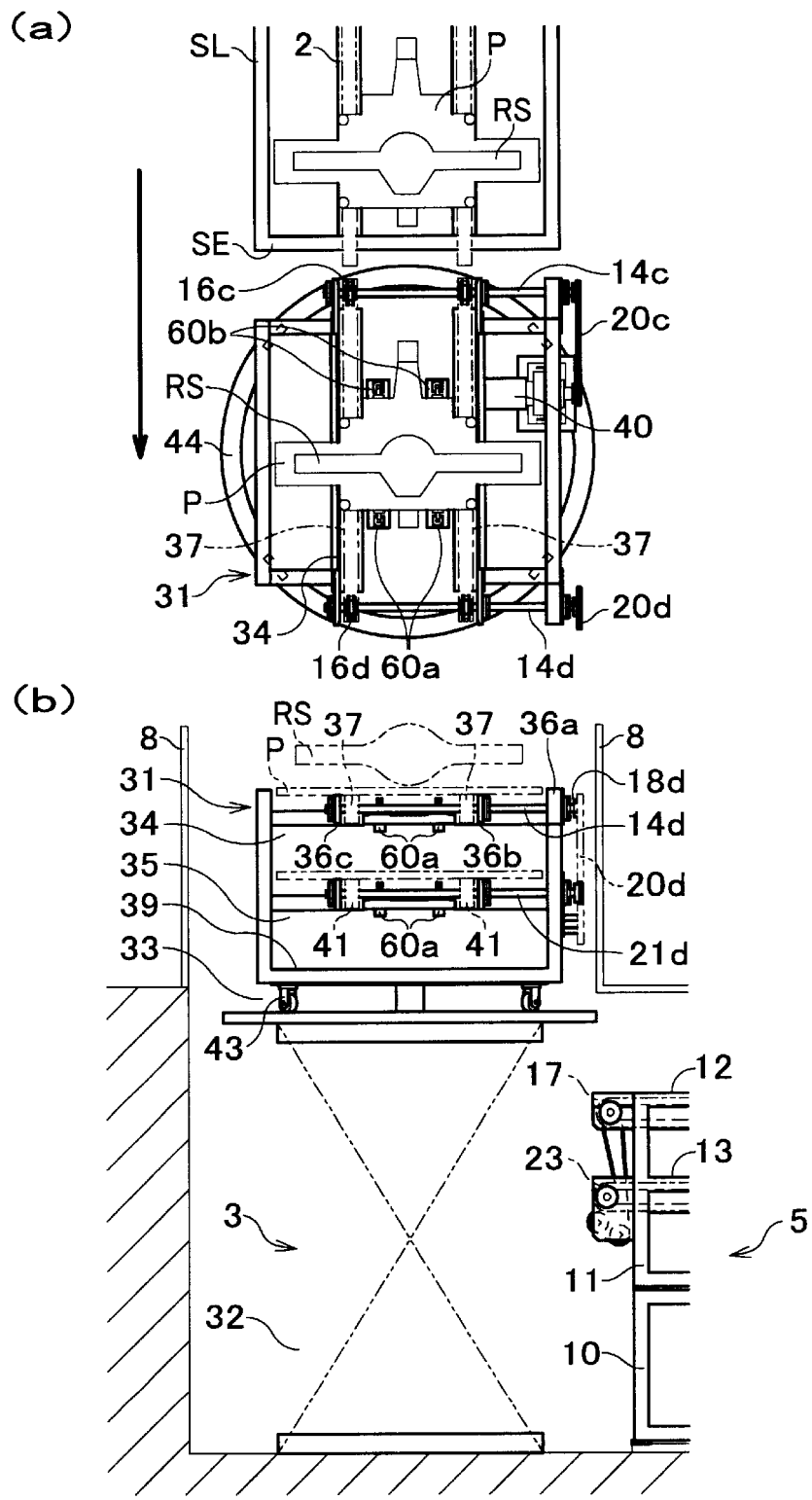
FIG. 4 consists of (a) and (b), in which (a) is a ground plan to explain the receipt process when a pallet is received from the subline (b) is a front elevation explaining receipt process.

The lift means for transfer 6, as shown in FIGS. 1, 2 and 4 (a), (b), has a transfer part 31, at which the rear suspension RS is received from the terminal SE of the subline SL, and the lift for transfer 32 to let move from the same height of the belt conveyor 2 of the subline SL to height of the first slide part 12 of a movement means 5 up and down. Furthermore, there is provided a turn means 33 formed between the transfer part 31 and the lift for transfer 32, by which directions of the rear suspension RS and the pallet P are to be arranged at turning 90 degrees.

There is provided the transfer part 31 having both a slide part for transfer 34 which is made of a chain conveyer for transferring of the rear suspension RS therein from the subline SL, and a slide part for return 35 which is located in the lower part of the slide part for transfer 34 and utilized in returning an empty pallet P after the rear suspension RS put on the pallet is assembled to the body F.

The slide part for transfer 34 has a chain 37, as shown in FIG. 2, comprising: an rotation axis 14c, 14d supported by the side flame 36a, 36b and 36c; a sprocket 16c formed with an rotation axis 14c; a sprocket 16d formed with an rotation axis 14d; a chain 37. The chain 37 has being hung and wound tightly around each interval formed each sprocket 16c and each sprocket 16d, which stand opposite to each other. The chain 37 communicates a turn of a motor of transfer part for drive 40 fixed in lower part frame 39 of the transfer part 31 to a pulley 18c through belt 20c and drives it by spinning the rotation axis 14c fixed in the pulley 18c.

On the other hand, a pulley 18d is made for a side frame 36a side of the rotation axis 14d and communicates a turn of the rotation axis 14d with drive of the chain 37 to the slide part for return 35 through a belt 20d.

Similarly, a slide part 35 for return, as shown in FIG. 1 and FIG. 4(b), comprises: the rotation axis 21c and the rotation axis 21d; a sprocket 22c formed around the rotation axis 21c; a sprocket 22d (not shown) formed around the rotation axis 21d; and a chain 41. The chain 41 has being hung and wound tightly around each interval formed each sprocket 22c and each sprocket 22d, which stand opposite to each other.

The chain 41 is driven, as shown in FIG. 1, by communicating a turn of the rotation axis 14d of the slide part for 34 to a pulley 42a made for the side frame 36a side of the rotation axis 21d. Moreover, the belt 20d is put between the pulley 42a and a pulley 42b fixed in the side frame 36a, and it is kept tension in addition to above by a pulley 42c.

As for the turn means 33, it comprises: several tires 43 fixed in lower part frame 39 of the transfer part 31; a motor (not shown) to let drive tire 43; a rail 44 like ring for guiding a turn movement of tire 43 (cf. FIG. 2). A quantity of turn of the turn means 33 is controlled by a turn number of the motor, but the turn means 33 can control the quantity of turn of the tire 43 by making a sensor for position search.

Subsequently, the lift means for assembly 4 is described.

As for the lift means for assembly 4 is described, as shown in FIG. 1 and FIG. 2, it comprises: a table for assembly 51 to receive the pallet P which carried the rear suspension RS that has been sent from the movement means 5; an X axis stage 52 letting the table for assembly 51 move to a move means 3 side; a lift for assembly 53 lets the table for assembly 51 and the X axis stage 52 move up and down.

The table for assembly 51 has: two ditches 54 formed along moving direction of the pallet P; a plurality of rollers 55 arranged along the ditches 54: a protruding part 56, the protruding part 56 having a role for stopping the pallet P by contacting with the point part 7a of the pallet P moving form the slide mechanism 5. And, as for this protruding part 56, there is it arranged on a rail 57 formed in a central part of the table for assembly 51, which is movable thereon and is connected with an air cylinder (not shown), and it is possible to send the empty pallet P out in the second slide part 13 by letting the protruding part 56 move along the rail 57 to the slide mechanism 5 side after the rear suspension RS is assembled to the body. Still more, the protruding part 56 serves as a search means to confirm a position of the pallet P, it is judged for the pallet P to be introduced into the table for assembly 51 by a control portion (not shown) when the point part 7a of the pallet P abuts thereon.

The X axis stage 52 is driven by an air cylinder 58 formed on the lift 53 and lets the table for assembly 51 move to the front or back direction along two slide bars 59.

There is provided the lift for assembly 53 letting the table for assembly 51 move to a fixed position and move a second lift 53b for independence with a first lift 53a. Hereupon, as for the fixed position above mentioned, it is given that a supply position receiving the rear suspension RS conveyed from the first slide part 12 of the slide mechanism 5 (cf. FIG. 6(a)), a waiting position for a chance being in the fixed distance of the upper part from the floor side FL of the main line ML, wherein the rear suspension RS is stood by, the assembly zone in which the rear suspension RS is assembled to the body F (cf. FIG. 6(b)) and the return position from which the empty pallet P after assembling the rear suspension RS is returned to the second slide part 13 of the slide mechanism 5 (cf. FIG. 6(c)).

In next, a procedure in which the rear suspension RS is assembled to the body F using the work conveyance mechanism 1 is described mainly on movement of the pallet P.

First, as the transfer process, the pallet P on which the rear suspension RS constructed in the subline SL is carried is transferred to a slide part 34 of the lift means for transfer 6 that stood by at the upper part, which is shown in FIG. 4(a) (b). At this point, there is provided a stopping means 60a, 60b for stopping the pallet P formed in a space between two chains 37 and 37, which let the pallet P stop on the slide part for transfer 34 by letting a stopper pin project toward the pallet P from the same.

When the pallet P stops on the slide part for transfer 34, as shown in FIG. 5 (a), the turn means 33 is driven and turns the transfer part 31 by 90 degrees in clockwise direction.

Subsequently, as shown in FIG. 5(b), the lift for transfer 32 is lowered and lets the slide part for transfer 34 of the transfer part 31 and the first slide part 12 of slide mechanism 5 stand in line on the straight line. Then stopping means 60a, 60b remove the rock state of the pallet P and the pallet P is conveyed from the slide for transfer 34 to the first slide part 12.

Hereupon, there is provided a stopping means 60b made for the lift means for assembly 4 side of the first slide part 12 (cf. FIG. 2), and the pallet P conveyed in the first slide part 12 stops by the stopping means 60b.

Figure 6:
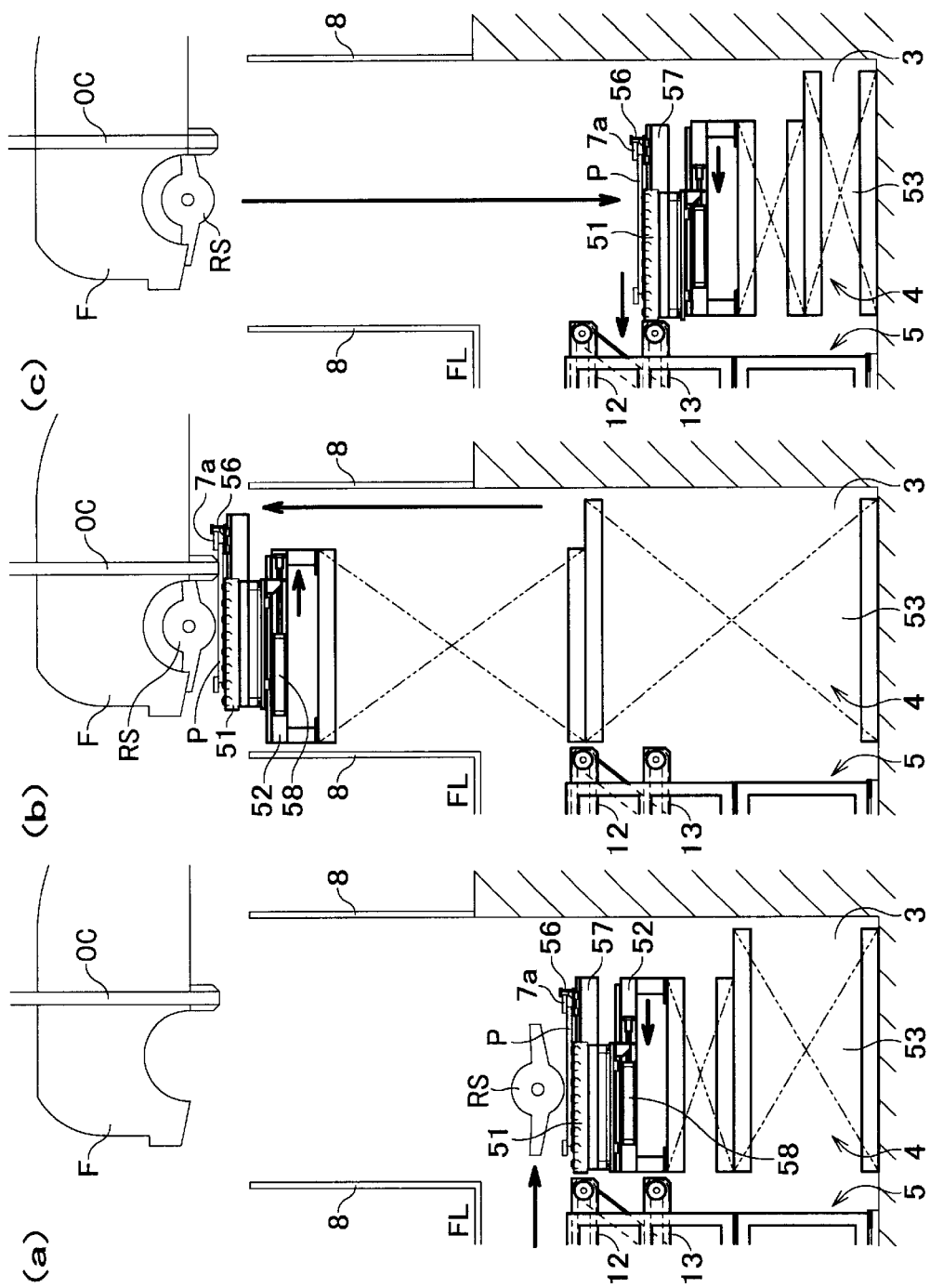
FIG. 6 consists of (a), (b) and (c), in which (a) is an illustration to show movement of pallets from the slide mechanism to the lift means for assembly, (b) is an illustration to show movement of pallets from the supply position to the assembly zone and (c) is an illustration to show movement of empty pallets from the assembly zone to the return position.

As mentioned above, while the pallet P stops in the first slide part 12, the actuator 58 of the X axis stage 52 of the lift for assembly 4 is driven and the first table for assembly 51 is approached to the first slide part 12, which is shown in FIG. 6 (a). Then, because the stopping means 60b removes a rock state of the pallet P by a signal of the control part, the pallet P moves from the first slide part 12 to the table for assembly 51 by that the point part 7a thereof abuts on the protruding part 56. Still more, a process in which the pallet P is moved from the slide part for assembly 34 to the table for assembly 51 is turned into the moving process described in range of the claim of the present invention.

And, when the point part 7b of the pallet P sticks to the protruding part 56, so that the pallet P stops, as well as the table for assembly 51 comes back to an original position, the lift for assembly 53 rises as a rising process and the pallet P ascends by the position for waiting for a chance, which is a fixed distance lower of that of the assembly zone to body F. In this place, by a signal from the control department, the lift for assembly 53 rises more after a worker identifies the body F and the rear suspension RS and; lets the pallet P move to the assembly zone of the body (shown in FIG. 6(b)). So a worker assembles the rear suspension RS carried by pallet P in the body F.

When the assembling to body F of the rear suspension RS is finished next, the lift for assembly 53 is lowered with carrying the empty pallet and lets the table for assembly 51 move to the return position that shows in FIG. 6(c).

Then the protruding part 56 of the table for assembly 51 moves along the rail 57 and the empty pallet P is pushed to the second slide part 13. And then, the empty pallet P pushed to the second slide part 13 moves along the second slide part 13 until it is stopped by the stopping means 60a (cf. FIG. 3(a)) which is formed in the axis 21b side of the second slide part 13.

Figure 7:
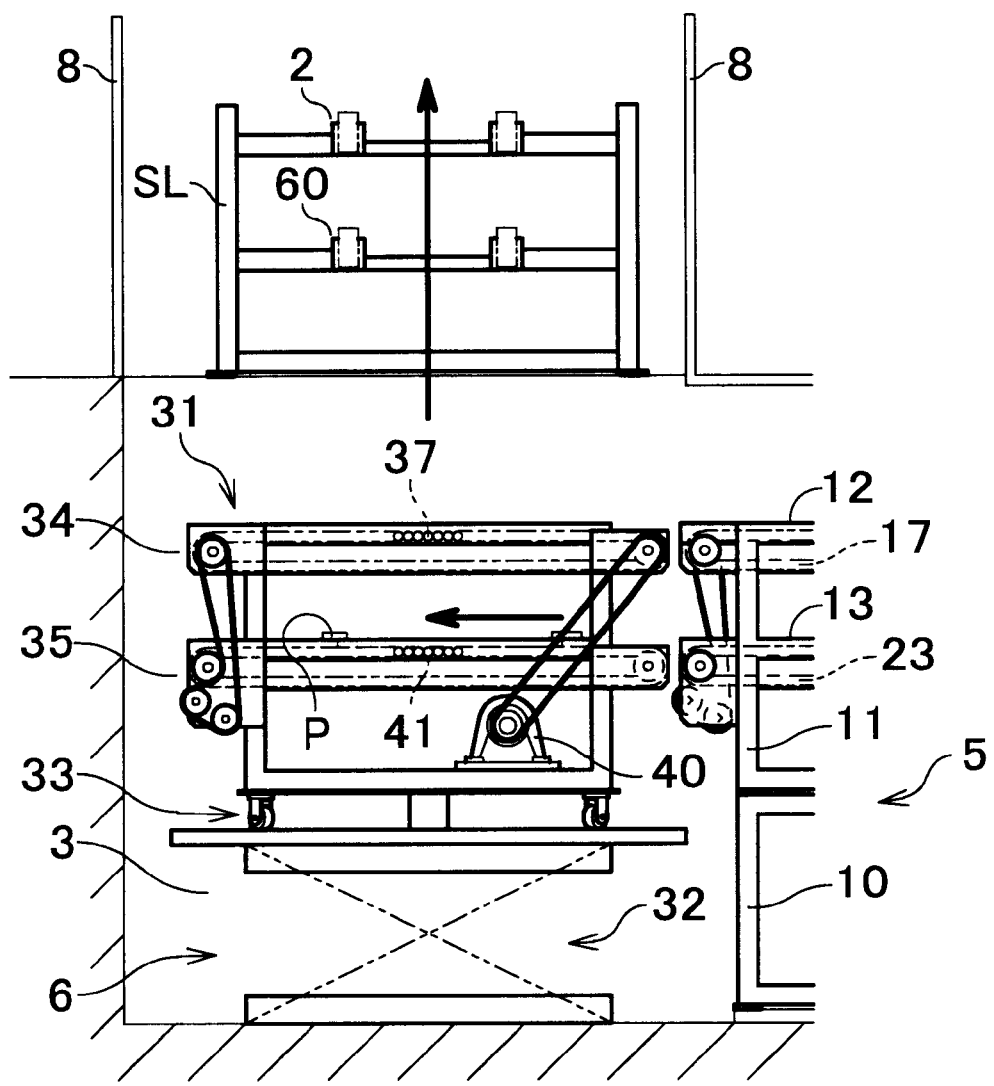
FIG. 7 is an illustration to show the state that the pallet moved to a guide portion for return of the lift means for transfer.

Hereupon, after confirming that the second slide part 13 and the slide part for return 35 of the lift means for transfer 6 have stood in a line on the straight line, the control department removes a rock of the stopping means 60a and, as shown in FIG. 7, the pallet P is conveyed from the second slide part 13 to the slide part for return 35.

Furthermore, in the slide part for return 35, the stopping means 60a lets the pallet P stop (cf. FIG. 4(b)). Then, the lift for transfer 32 works, and the slide part for return 35 rises till it has the same height of a chain conveyer for return 60 formed in the lower part of the chain conveyer 2 of the subline SL. When the slide part for return 35 is risen thereto, the turn means 33 is driven and lets the slide part for return 35 turn 90 degrees in counterclockwise direction. Then, the pallet P is given back from the slide part for return 35 to the chain conveyer for return 60, because the chain conveyer for return 60 and the slide part for return 35 stand in line on the straight line, by removing a rock of the stopping means 60a.

The pallet P returned by the chain conveyer for return 60 is conveyed to an initial point of the subline SL, and it is transferred here on the chain conveyer 2.

The pallet P which gives back to the initial or starting point of the chain conveyer 2 in this way is conveyed again by the chain conveyer 2, and new rear suspension RS is constructed thereon.

Because there is such work conveyance mechanism 1, in which the rear suspension RS is supplied to the body F from the lower part than the floor side FL of main line ML, there is no place on the floor, in which the conveyance mechanism complicated such as a rail for transfer, a drive means for transfer or the like is laid, so that a worker without minding steps can perform a work for assembly to the body F with good efficiency.

Moreover, because the pallet P to be loaded with the rear suspension RS is made with simple constitution, the pallet P not only can be circulated immediately, but also has flexibility to correspond to changes of the subline SL.

Still more, the present invention is not limited to an embodiment and it can be applied broadly. For example, a work to convey may be an engine and a door instead of the rear suspension RS.

Besides, it can be also constituted that the subline SL is laid in lower part of the floor side FL of the mainline ML and the rear suspension RS supplied to the assembly zone of the body F through the slide mechanism 5 and the lift means for assembly 4.

Furthermore, the subline SL is not been there provided, it is good as the work conveyance mechanism to supply the work to be carried in from outside factories for the body F from the lower part than the floor side FL of the mainline ML.

And, it is possible that the first slide part 12 or the like is constituted with a belt conveyor so that a work is conveyed not to use pallet P Industrial Applicability This invention consists of the mechanism for conveying the work, in which respectively, a work transferred from the subline is made move to the lower supply position than the floor side of the main line and the work is risen to the assembly zone by the lift means for assembly from the supply position. Accordingly, because the work conveyance mechanism is not laid on the floor side, a worker can perform a work for assembly with good efficiency smart and safely.

Besides, there is provided the move means constituted with both the slide mechanism to make the work move parallel to the floor side thereunder and the lift for transfer means conveying the work to top and bottom direction in order to make the same move in the slide mechanism. Accordingly, even if the mainline and the subline are laid on the same floor side, the work constructed in the subline can be supplied to the body from under the floor.

And, when an installation direction of the body is different from a direction of the work conveyed on the subline, because there is the turn means formed in the lift for transfer means, by which the direction of the work is arranged, the work for assembly to the body can be performed immediately.

Beside, as for the slide mechanism, it is constituted with the first slide part to let the pallet loaded with the work move to the supply position and the second slide part to be arranged in a fixed distance under the first slide part and as for the lift for assembly means, which is constituted that it is movable from the position of the assembly zone to the place for returning the empty pallet, so that, it is possible that the pallet carried the work is moved in the first slide part, and the empty pallet after assembling the work to the body is moved in the second slide part. Accordingly, the constructing or assembly of the work and the assembling the work to the body can be performed at higher efficiency.

What is claimed is:

1. A work conveyance method, in which a work loaded on a pallet constructed in a subline is conveyed to an assembly zone of a body moving along a mainline, which includes:
   a transfer process, in which the pallet loaded with the work is transferred from the subline;
   a moving process, in which the pallet loaded with the work is moved in a lower part than a floor side of the mainline, and is moved parallel to the floor side of the mainline until the pallet is stopped when a protruding point part of the pallet is contacted to a protruding part of an assembling table on a lifting means so as to be supplied to a supply position that is underneath said assembly zone; and
   a lifting process, in which the work is lifted from said supply position to said assembly zone.

2. A work conveyance method according to claim 1, further comprising a turning process wherein said pallet loaded with said work is turned 90 degrees by a turn means provided on a slide part for transfer.

3. A work conveyance mechanism wherein work loaded on a pallet constructed in a subline is conveyed to an assembly zone of a body in order to assemble the work loaded on the pallet to the body moving on a mainline, which comprises:
   a moving means, in which the pallet loaded with work is transferred from the subline on a floor side of said mainline, is made to move under the floor of said mainline until the pallet is stopped when a protruding point part of the pallet is contacted to a protruding part of an assembling table, and is supplied to a supply position under the assembly zone; and
   a lifting means, in which the work is lifted from said supply position to said assembly zone, wherein the lifting means includes the assembling table.

4. A work conveyance mechanism according to claim 3, further comprising a turn means provided on a slide part for transfer for turning said pallet loaded with said work 90 degrees.

5. A work conveyance mechanism, wherein work loaded on a pallet constructed in a subline is conveyed to an assembly zone of a body in order to assemble the work loaded on the pallet to the body moving on a mainline, which comprises:
   a moving means, in which the pallet loaded with said work transferred from the subline, is made to move under the floor of said mainline uniil the pallet is stoppped when a protruding point part of the pallet is contacted to a protruding part of an assembling table and is supplied to a supply position under the assembly zone; and
   a lifting means in which the work is lifted from said supply position to said assembly .zone, wherein said lifting means includes said assembling table,
   wherein said moving means comprises:
      a slide mechanism, in which the work is moved parallel to said floor side thereunder; and
      a lift means for transfer, in which said work can be moved up and down in order to transfer to said slide mechanism from the subline.

6. The work conveyance mechanism according to the claim 5, wherein said lift means for transfer is provided with a turn means for letting a direction of the work turn a fixed angle.

7. The work conveyance mechanism according to the claim 5 or the claim 6, wherein said slide mechanism possesses a first slide part in which a pallet loaded with said work is to be moved to said supply position and a second slide part which is arranged a fixed distance below from said first slide part, and said lifting means can move from said assembly zone to a return position at which said pallet is returned in the second slide part.

* * * * *